United States Patent [19]

Chaveron et al.

[11] Patent Number: 4,713,256

[45] Date of Patent: Dec. 15, 1987

[54] PROCESS FOR PREPARING A CHOCOLATE PASTE

[75] Inventors: Henri Chaveron, Paris; Jean Pontillon, Meulan; Michel Billon, Unieux; Hervé Adenier, Compiegne, all of France; Ahmed Kamoun, Sfax, Tunisia

[73] Assignee: Clextral, Paris, France

[21] Appl. No.: 731,622

[22] PCT Filed: Aug. 24, 1984

[86] PCT No.: PCT/FR84/00192

§ 371 Date: Apr. 26, 1985

§ 102(e) Date: Apr. 26, 1985

[87] PCT Pub. No.: WO85/00957

PCT Pub. Date: Mar. 14, 1985

[30] Foreign Application Priority Data

Aug. 26, 1983 [FR] France ............................. 83 13769

[51] Int. Cl.$^4$ ............................................ A23G 1/16
[52] U.S. Cl. ................................... 426/631; 426/443; 426/486; 426/660; 241/260
[58] Field of Search ............... 426/660, 629, 615, 631, 426/443, 486, 518

[56] References Cited

U.S. PATENT DOCUMENTS

| | | | |
|---|---|---|---|
| 3,265,508 | 8/1966 | Wurzberg | 426/660 |
| 3,265,509 | 8/1966 | Wurzberg | 426/660 |
| 3,265,510 | 8/1966 | Wurzberg | 426/660 |
| 4,042,721 | 8/1977 | Ziccarelli | 426/631 |
| 4,151,308 | 4/1979 | Ziccarelli | 426/631 |
| 4,191,786 | 3/1980 | Nappen et al. | 426/631 |
| 4,224,354 | 9/1980 | Szegvary | 426/518 |
| 4,296,141 | 10/1981 | de Paolis | 426/631 |
| 4,308,288 | 12/1981 | Hara | 426/631 |

FOREIGN PATENT DOCUMENTS

| | | | |
|---|---|---|---|
| 518293 | 11/1955 | Canada | 426/631 |
| 3338630 | 5/1985 | Fed. Rep. of Germany | 426/631 |
| 1567475 | 4/1969 | France . | |

OTHER PUBLICATIONS

Minifie 1980 Chocolate, Cocoa and Confectionary, 2nd edition, AVI Publishing Co., Westport, CT, p. 122.

Primary Examiner—Raymond N. Jones
Assistant Examiner—Carolyn Paden
Attorney, Agent, or Firm—Pollock, Vande Sande & Priddy

[57] ABSTRACT

A process for the preparation of chocolate paste is disclosed wherein various ingredients such as cocoa and powdered sugar are subjected to grinding and powdered sugar are subject to operations grinding to a predetermined degree of particle size, fluidification by dispersion of the particles of sugar and cocoa into a continuous fatty phase and of degassing for the removal of water and undesirable volatile compounds. At least one portion of the treatment is carried out in a conveyor with several screws provided with means for regulating the temperature of the entrained material. According to the invention, after a preliminary grinding of the ingredients to obtain a refined paste having the desired degree of particle size in the screw conveyor a dry-conching treatment of the refined paste is carried out and then the liquefaction of the paste is obtained by the incorporation of adjuvants. The dry conching treatment comprises a first step of simple malaxation of the refined paste with rise in temperature and then at least one second malaxation step with production of effects of rolling and shearing whose intensity increases progressively, each malaxation step being followed by a degassing step and the intensity of said effects of rolling and shearing being determined so that the means of regulation of the temperature of the material enable the latter to be maintained at the optimum level of conching and the particle size is preserved.

8 Claims, 6 Drawing Figures

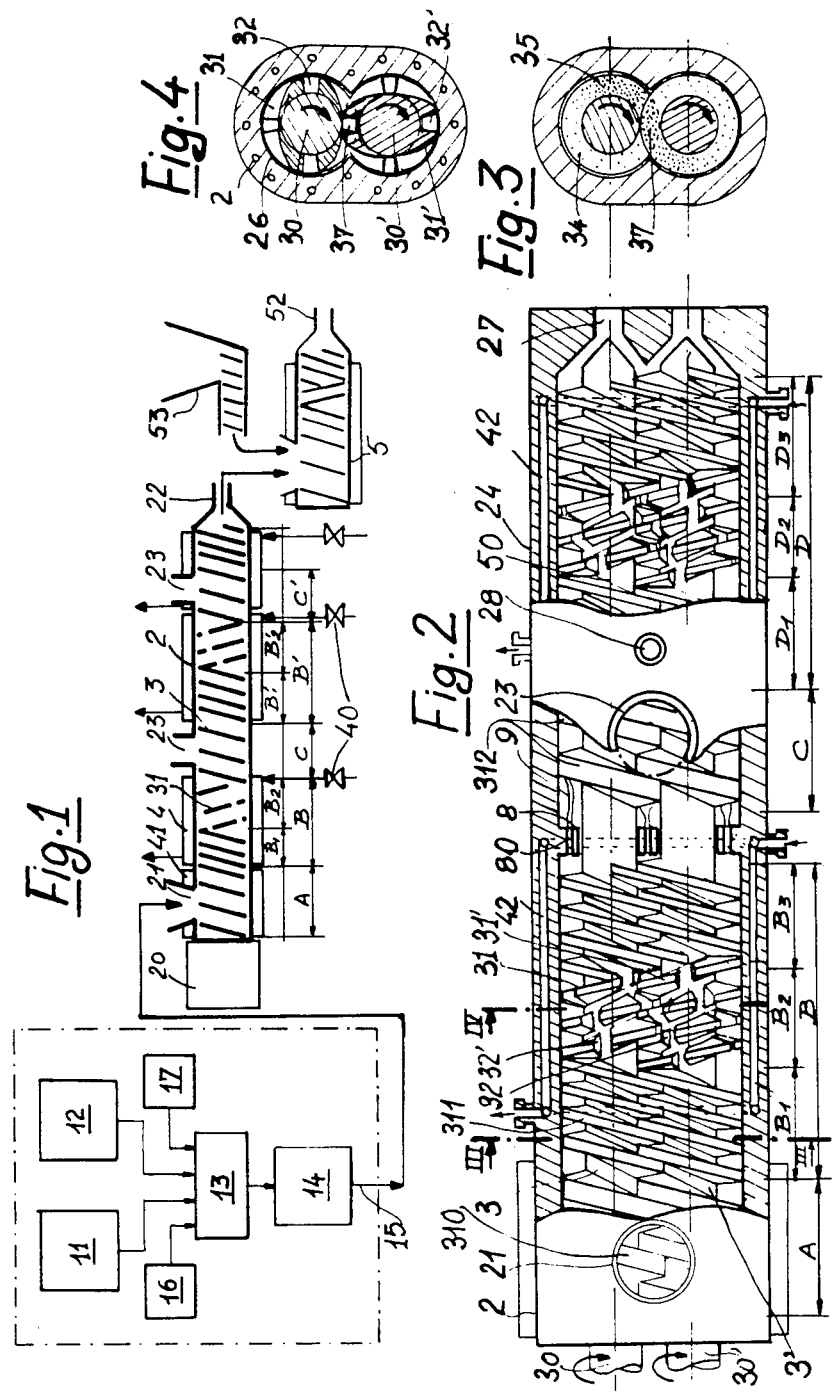

PROCESS FOR PREPARING A CHOCOLATE PASTE

FIELD OF THE INVENTION

The invention relates to a process for preparing a chocolate paste.

Generally, to produce plain chocolate, a pasty mass of cocoa is first prepared which is mixed with sugar previously ground to a very small particle size, of the order of 100 microns. The pasty mass of cocoa and sugar, and optionally, in the case of milk chocolate, the dehydrated milk powder, are mixed in suitable proportions with a minimum of cocoa butter and the chocolate paste thus-prepared then undergoes refining in a device constituted by a plurality of cylinders, generally five, between which the particle size is again reduced until a refined paste is obtained in flake or very fine powder form, of the order of 10 to 20 microns, which can then be mixed with a predetermined proportion of cocoa butter.

For producing quality chocolate, the refined mass is subjected to the process long known under the name of conching and which consists of causing the paste to undergo prolonged kneading, carried out in special vessels called conches. It is in the course of this conching treatment that the aroma is produced and that the desired rheological properties of the chocolate are obtained.

In general, it is accepted that the conching treatment enables the production of a dispersion of the particles of sugar and cocoa in a continuous fatty phase constituted on the one hand by fats extracted from the cocoa due to the heating and to the effects of the kneading produced in the conch, and on the other hand of the cocoa butter or other additives incorporated in the paste. At the same time oxidation and degasification is produced with transfer to the atmosphere of water vapor and undesirable volatile components such as acids, aldehydes, ketones. As a result there is, moreover, a reduction in viscosity and of the flow limit and an unctuous fluid pasty mass is finally obtained which can be easily molded.

The principal improvement added to this very old treatment consists of carrying out the conching in two steps, the first called dry conching which consists of kneading the cocoa paste alone or with a small amount of cocoa butter and the second called liquid conching, or liquefaction, in the course of which the major part of the cocoa butter is incorporated with the pasty mass. These two steps are carried out in separate conches or in two phases in the same conch and on large amounts of pasty mass and each requires a very long time, of several tens of hours. This results therefore in a discontinuity in the production line of preparing the chocolate and in addition, due to the fact of the length of the treatment, a considerable expenditure of energy.

For a long time attempts have been made to modify the treatment of preparing the chocolate to render it continuous and faster. However, until now, it has been sought purely and simply to eliminate the conching by replacing it by treatments enabling the liquefaction to be produced and the aroma to be developed by other means, generally chemical. If there has been success in rendering the process continuous, on the other hand the replacement of the mechanical treatment by chemical treatment has not introduced a true economy.

There exist, however, processes in which the preparation of the chocolate paste and particularly its liquefaction are produced mechanically and continuously.

French Patent No. FR-A-1,567,475, for example, describes a process and an installation of preparing chocolate continuously in three successive steps:

First, the different solid and liquid ingredients, are brought, in proportions conforming with the recipe, into a kneading device constituted by a screw conveyor comprising an elongated sleeve within which two parallel screws are rotated.

The mixture thus produced then passes into a liquefaction apparatus, constituted by a pump rotating at high speed and enabling, by a shearing effect, a low viscosity mass to be obtained. The latter then passes into a degasification device constituted by a screw conveyor from which the paste is driven by long screws surmounted by a cupola in which a vacuum is formed.

Such an installation therefore enables the conventional refining devices as well as the conches to be replaced, but it is necessary to operate, from the start, on all the ingredients of the mixture and particularly the cocoa butter, and liquefaction is obtained by a centrifugation effect that may be considered as too strong. The same is true of the majority of known installations for preparing chocolate continuously.

Now, the preparation of chocolate and particularly conching are delicate operations to master to obtain a chocolate of sustained quality, and therefore the employment of the traditional process of preparation, in spite of its drawbacks, has for the most part been continued.

SUMMARY OF THE INVENTION

It is an object of the invention to provide a process enabling chocolate to be prepared continuously and in a very short time while respecting the essential requirements of the traditional process and obtaining a product of quite comparable quality.

In addition, the conditions in which the conching is carried out according to the invention can be adapted to all formulae, particularly milk chocolate, and enable the desired rheological properties to be very easily obtained, in the same manner as in a conching treatment carried out traditionally in two successive steps of dry conching and liquid conching.

According to the invention, after preliminary grinding of the ingredients to obtain a refined pasty mass having the desired degree of particle size, the refined paste is subjected to a dry conching treatment in the screw conveyor, the paste obtained being then subjected to a liquefaction treatment by incorporation of additives in proportions according to the recipe; the dry conching treatment carried out in the conveyor comprises a first step of simple kneading of the refined paste with rise in temperature, and then at least one second kneading step with the production of rolling and shearing effects whose intensity increases gradually, kneading step being followed by a degasification step. The intensity of said rolling and shearing effects is determined so that regulating means of the temperature of the material enable the latter to be maintained at the optimum conching level while preserving the particle size of the paste.

Preferably, the liquid conching is carried out by combined effects of kneading, rolling and shearing and at a temperature maintained at the optimum conching level, in an additional zone of the screw conveyor supplied with the dry-conched paste and into which are introduced the necessary amounts of cocoa butter and additives.

In addition, it is advantageous to carry out the dry-conching progressively in several successive treatment zones each comprising a kneading sector and a degasifying sector.

The screws being composed of juxtaposed sections of different characteristics determining different effects, it is possible, for a given refined paste of homogenous quality and for an average rotary speed of the screws, to determine empirically, by successive tests, the composition, the length and the number of treatment zones, so that the temperature of the material can be maintained at each point at the desired level by the combined effect of self-heating due to friction and regulation of the temperature of the screw conveyor. The quality of the treatment can be checked permanently by controlling both the release through the degasifying zones of the water and of the undesirable aromas, and the taste and particle size of the paste at the outlet from the screw conveyor. It is then possible to produce continuously a paste of controlled quality by modifying the rotary speed of the screws and regulation of the temperature.

It is also an object of the invention to provide an installation for the continuous preparation of chocolate paste comprising a screw conveyor supplied continuously with the paste previously refined to the desired particle size and comprising a supply and heating zone with kneading of the refined paste, and at least one zone of treatment at a controlled temperature followed by a degasifying zone.

Each treatment zone comprises a section for compression of the material in which the screws have a close pitch, and a braking section which, according to the degree of rolling and shearing desirable, can include eccentric disks or indeed reverse pitch threads provided with apertures for the passage of material downstream.

BRIEF DESCRIPTION OF THE DRAWINGS

The invention will be better understood through the detailed description of an installation, shown in the accompanying drawings, and of several embodiments, given purely by way of example.

FIG. 1 shows schematically the whole of an installation for preparing a chocolate paste.

FIG. 2 is a plan view, in axial section, of a screw conveyor for practising the process according to the invention.

FIGS. 3 and 4 are sectional views, respectively along the lines III—III and IV—IV of FIG. 2.

DETAILED DESCRIPTION

Figure 5:
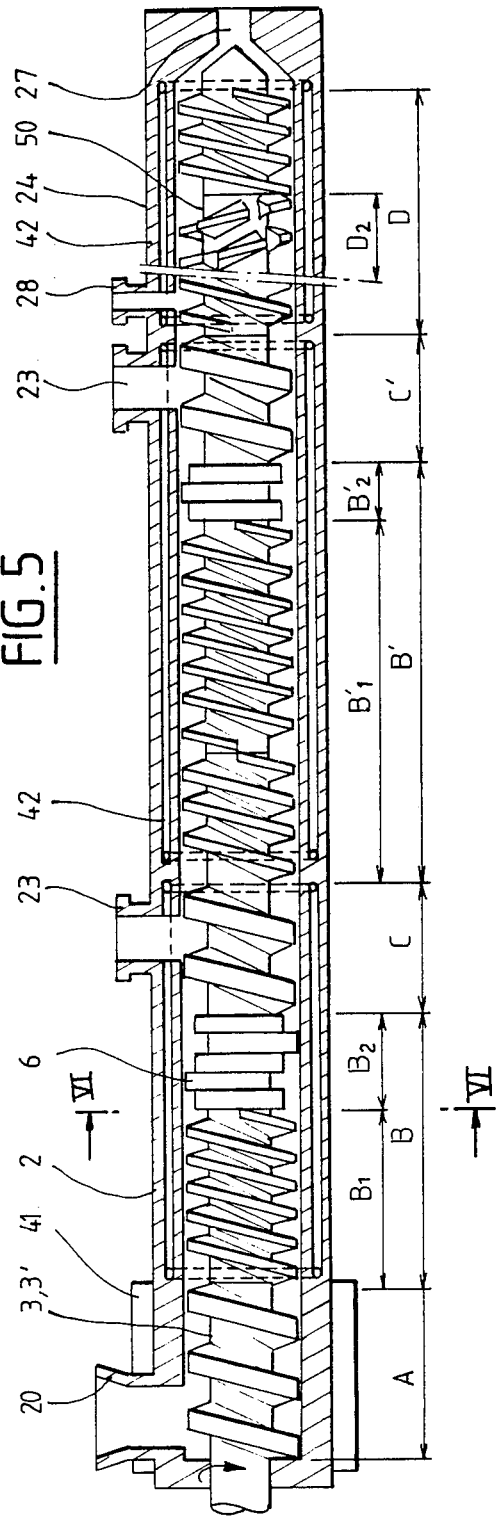
FIG. 5 is a side view, in section through the axis of a screw, of a second embodiment of the invention.

In FIG. 1 shows schematically a conventional installation for the preparation of a chocolate paste. The powdered cocoa and powdered sugar are first ground separately in devices 11 and 12, then mixed in a kneading mixer 13, until a relatively fluid paste is obtained. If needed, a small amount of cocoa butter or other additives can be added through measuring devices 16 and 17. The mixture so prepared then passes into refining device 14 constituted, mostly, by a five-roll grinder, and at its outlet 15 is obtained a paste refined to the desired degree of particle size, for example of the order of 15 to 20 microns.

In conventional processes, the thus refined paste is subjected to conching, which enables the flavor and viscosity of the paste to be particularly improved by subjecting it simultaneously to oxidation and to kneading for a very long time, for example 24 to 72 hours. Generally, dry conching is first performed, i.e., practically without the addition of cocoa butter, and this is followed by liquid conching which enables the liquefaction of the paste to be effected by incorporation of cocoa butter or of other additives in the desired proportion.

According to the essential feature of the process, the dry conching is carried out continuously in a screw conveyor 2 which has been shown schematically in FIG. 1 and in detail in FIG. 2.

The screw conveyor 2 comprises at least two screws 3 with parallel axes, rotated by a device 20 inside a long sleeve provided at its upstream end, in the direction of transport of the screws, with a supply hopper 21, and at its downstream end with an outlet orifice such as a die 22.

The material introduced through the hopper 21 is conveyed downstream by the rotation of the screws which operate as a pump. At the same time, it is subjected to kneading under conditions which depend on the characteristics of the threads, and particularly their pitch and their depth.

Besides, by heating or by cooling the sleeve, it is possible to modify the temperature of the material due to the effect of driving the latter in a thin layer along the screws, which facilitates heat exchange.

It is thus possible to distinguish, from upstream to downstream, several treatment steps within the screw conveyer.

In the upstream portion A, the screws 3 are provided with threads 310 with a wide pitch enabling the rapid downstream propulsion of the material introduced through the hopper 21 by subjecting it to simple kneading without compression. In this zone, the jacket is provided with heating means 41 constituted, for example, by electrically heated sleeves or enclosures traversed by a heat transfer fluid. The material is hence subjected to a rise in temperature well-distributed in the mass by the kneading effect, and which reduces the viscosity thereof. It is thus possible to raise the temperature of the material rapidly to the usual level for conching, i.e., of the order of 90° C. for plain chocolate.

The material then passes into a second kneading zone B where rolling and shearing effects are produced whose intensity increases progressively. For this purpose, the screws can be constituted, for example, of a first section B1 constituted by threads 311 whose pitch decreases and by a second section B2 in which the pitch of the threads 31 determines braking of the material and consequently a progressive compression downstream of the section B1. This increase in pressure determines growing effects of rolling and shearing which depend on the composition of the screws 3 and which result in an increase in temperature of the material by self-heating. This rise in temperature is compensated by cooling of the sleeve 2 which can, for example, be surrounded by an enclosure 4 in which a cooling fluid is caused to pass. By regulating, for example, the flow rate of the fluid by means 40 it is possible to ensure a temperature regulation enabling the temperature of the material to be maintained at the level reached at the outlet of the heating zone A, i.e., at the conching temperature.

The material then passes into a degasifying zone C in which the threads 312 have a widened pitch; in addition, the sleeve is provided in this zone with at least one orifice 23 which opens widely onto the screws and which places the interior of the sleeve in communication with the atmosphere or an enclosure placed under a certain vacuum. It is also possible to circulate inside the sleeve a scavenging gas. The water vapor and the volatile components released are thus immediately evacuated and it is possible to control this degassing effect at the outlet of the orifice 23 and to verify at the same time the effectiveness of the treatment and the maintenance of the temperature at the desired level.

The material can then pass into a second treatment zone B' followed by a second degasifying zone C' before emerging at the downstream end of the sleeve 2 which can be provided with a die 22 enabling the final homogenization of the paste to be ensured by extrusion.

At the outlet from the screw conveyor 2 the material drops into a liquefaction device which can be constituted by a second screw conveyer 5 into which are introduced in the desired amount the cocoa butter and additives such as lecithin by means of a measuring device 53. Within the screw conveyor 5, the screws are provided also with a feed zone, with a compression zone and with a braking zone which produce intense kneading enabling the cocoa butter and the additives to be incorporated with the paste emerging from the screw conveyor 2 and a liquefied paste to be obtained at the outlet from the screw conveyor 5.

FIG. 2 shows in more detail a screw conveyor for carrying out the process.

The two screws 3 and 3' are constituted, in known manner, from juxtaposed elements having different threadings and fitted onto shafts 30 and 30' rotated by the motor 20 and provided with grooves which permit the rotary motion to be transmitted to the screw elements. Preferably, the shafts 30 and 30' are rotated in the same direction, screws 3 and 3' being provided with identical threadings which mesh with one another.

Due to this arrangement, it is possible, when developing of a treatment, to vary the composition of the screws fairly rapidly if screw elements 3 and 3' are available whose characteristics such as length, depth and pitch of the threads, can vary. In particular, in the examples shown, the feed cross-section A will be constituted by threads 310 with a wide pitch and the compression section B1 of threads 311 with a close pitch. The braking section B2 will comprise threads 31 with a reverse pitch having therefore a tendency to repel the material upstream and, consequently, to oppose its normal advance downstream, which causes a compression in the section B1.

In FIG. 4, which is a cross-section in the reverse pitch section B2, it is seen that the threads 31, 31' of the two screws 3, 3' are provided with apertures 32, 32' forming windows which extend radially between the shaft 30 and periphery of the thread. These apertures enable the passage downstream of a certain amount of material under the effect of the pressure, this passage taking place principally in the central zone 37 where the screws mesh with one another if precaution is taken of so arranging the elements that the windows 32, 32' come into coincidence in pairs in the central zone 37 with a periodicity which depends on the number of windows per revolution.

In the little compressed zones such as the feed zone A, the material has a tendency to be rotated around the shafts with the threads, in the direction of rotation of the screws. On arriving in the meshing zone 37, when the screws rotate in the same direction, the material which finds itself in a thread tends to pass onto the periphery of the other screw but, due to the fact of the meshing, the passage cross-section is narrowed since at this spot the threads penetrate into one another. As a result there is a compression of the material upstream, and each thread comprises a decompressed sector 34 and a compressed sector 35. This alternation, within the same thread, of the compressed and decompressed zones, facilitates malaxation of the material. In addition, the passage from one screw to another in the meshing zone 37 determines a certain rolling effect which increases in intensity progressively as the material advances downstream, the compressed sector 35 then increasing in size and finishing by completely filling the thread. When the pressure increases, the material also has a tendency to pass between the thread tops and the inner wall 26 of the jacket which are separated by a clearance greater than the dimension of the solid particles. There is as a result a rolling and shearing effect in the compressed zones.

However, the effects of rolling and especially shearing are produced principally in the reverse pitch zone B2, particularly on passage into the windows. By modifying the length and the pitches of the various juxtaposed elements constituting the screws, it is possible to vary the intensity of the effect of rolling and shearing to which the material is subjected and consequently the rise in temperature which results therefrom through the self-heating effect due to friction. This heating is determined so as to be compensatable by temperature regulation of the sleeve with which the material is in contact over a large surface area, especially when the threads are not very deep. For this purpose, as has been shown in FIG. 2, it is advantageous to pierce into the sleeve a set of channels 42 which extend over the whole length of the treatment zone B. By circulating a heat transfer fluid such as cold water in the channels 42, with a variable flow rate regulated by means 40, it is possible to ensure the regulation of the temperature of the material so that the latter is maintained at the level desirable for conching, of the order of 90° C. for plain chocolate, and in any case not exceeding 120° C. The heating being carried out under pressure and in a shorter time, it may in fact be advantageous to subject the material to be slightly higher temperature than in conventional conches, at least in the case of plain chocolate, to accelerate the treatment and facilitate particularly dehydration and degassing.

Considering that the friction and consequently the heating resulting therefrom diminish with the viscosity which itself diminishes with the rise in temperature, it will be possible to increase progressively the effects of rolling and shearing undergone by the material in the course of its transfer in the treatment zone progressively with the reduction in viscosity by modifying the conditions of advance of the material. For a given paste, it will thus be possible to determine empirically, by successive trials, the screw composition which will permit, for an average rotary speed of the screws and for an average flow rate of heat transfer fluid in the channels 42, to ensure a maximum kneading while maintaining the temperature at a substantially constant level.

The effect of rolling and shearing obtained especially in the reverse pitch zone B2 can be reinforced if necessary by an extrusion effected at the outlet of the treatment zone B. For this purpose, the latter comprises, in the example shown, a third zone B3 with a closer pitch which takes up the material again emerging from the braking zone B2 to cause it to pass through dies constituted, for example, by orifices 80 formed in a diaphragm 8. In this way a plurality of filaments 9 is produced which emerge into a degassing enclosure constituted, very simply, by the section C of the screw conveyor in which the latter have a widened pitch and pass in front of a degassing orifice 23. In the zone C with widened pitch, the material undergoes slight kneading without compression which permits renewal of the parts in contact with the atmosphere or a scavenging gas flowing in the sleeve. There is also produced, at the outlet of the dies 80, an expansion of the material and vaporization of the volatile compounds, and particularly of the water vapor dissolved under pressure in the mass.

It will also be observed that, in the feed zone A where the threads are not completely filled, air can penetrate through the orifice 21 and rise into the decompressed zones 34 by passing between the periphery of the threads and the inner wall of the sleeve. Thus, during the whole process of progressive compression, the material is kneaded in the presence of air and can entrain a portion thereof which remains dissolved under the effect of the pressure in the compressed zones. In addition, the material entrained in the threads in thin layers undergoes a sort of turning over on passing from one screw to the other and there results therefrom an intimate contact of the paste with the air or the gas which is in the decompressed zones.

There are thus produced inside the screw conveyor a group of phenomena which are related to the conching and which, in any case, permit the effects thereof to be obtained. Due to the temperature elevation due firstly to the heating of the sleeve and then to the effect of mechanical working and of friction, the globules of the fatty phases contained in the cocoa fluidify and, due to the intense kneading and to the rolling and shearing effects, have a tendency to migrate to the surface and to coat the solid particles of cocoa and of sugar. On the other hand, the kneading in the presence of air and the entrainment of a certain portion of the latter facilitate oxidation of the mass and subsequent degassing with evaporation of the water and of the undesirable volatile components and development of the aroma.

The advantage of the process according to the invention is due to the particular configuration of the screw conveyor which has just been described, the ability to subject the refined paste to intense effects of rolling and of shearing while controlling the temperature to maintain it at the optimum conching level. In this way a treatment is achieved quite analogous to dry conching, i.e., effecting the fluidification of the paste with the fatty material contained in the cocoa, without the addition of cocoa butter.

Besides, as in the conventional conching process, the oxidation of the paste and the degasifying are carried out at the same time as the kneading and enable the progress of the treatment to be controlled. In fact, due to the use of a machine with several screws, the transfer of the material can be accomplished at atmospheric pressure and it is possible, by analysis or simply by odor, to control directly, through the orifices 23, the effectiveness of the degassification, the temperature and the quality of the mass, by carrying out samplings as necessary. It is possible in particular to check that the paste does not take on an odor or a burnt taste and that the particle size conferred in the refining is preserved. By thus monitoring the treatment process, it is possible to arrive, empirically, at a determination of a suitable profile of the screws and particularly the pitch, the length, and the number of treatment sections to obtain a dry-conched paste at the desired temperature.

In the particularly advantageous embodiment shown in FIG. 2, the liquefaction of the paste is carried out in an additional section D of the screw conveyor. To this end, the sleeve 2 of the latter is extended by a portion 24 surrounding extensions 50 of the two screws 3 and 3'. The latter comprise a progressive compression section D1, placed following the degasifying section C, a braking section D2 in which the threads have a reverse pitch and are provided with passage apertures, and a homogenization and compression section D3, with close pitch, preceding the dies 27 placed at the downstream end of the sleeve 24, each on the axis of one screw.

The material emerging from the degasifying section C is drawn directly by the screws into the section D1, the latter being provided with an orifice 28 opening inside the sleeve and through which a measured amount of cocoa butter is introduced under pressure. The latter is rapidly mixed with the previously fluidized mass by dry conching, and a liquefied paste is obtained having the desired composition at the outlet 27 of the screw conveyor. In the liquefaction section D, it is also necessary to avoid a rise in temperature, and the sleeve is provided for this purpose with channels 42 for the flow of a cooling fluid. In any event, considering the drop in the degree of viscosity of the paste, the thermal effects of the kneading are less.

The operating conditions depend practically only on the extrusion parameters such as rotary speed and diameter of the screws, depth and pitch of the threads, and temperature of the sleeve, and are maintained over time if the starting ingredients, i.e., the composition of the refined paste, are unmodified. This is why, for a given refined paste, after having determined empirically the composition of the screws for an average rotary speed and for an average flow rate of the cooling fluid in the sleeve, it is possible to continue the production by modifying the rotary speed of the screws and the temperature regulation, and by controlling the quality of the paste and the effectiveness of the treatment by the degasifying orifices and at the outlet of the screw conveyor.

In fact, considering the speed of the treatment, it is possible to act immediately on the rotary speed of the screws and the temperature regulation when a change in quality is noticed, the flow rate of the material being controlled simply at the input end 80 of the screw conveyor.

By way of example, there was treated by extrusion a refined paste of plain chocolate having a proportion of fatty material of 26.6% and a water content of 2% and whose composition was as follows:
 sugar: 45%
 cocoa paste: 40%
 supplementary cocoa butter: 14%
 lecithin: 0.6%
 flavoring: 0.1%

A double screw extruder was used comprising a transfer zone and a progressive compression zone followed by a braking zone comprising two inverse pitch threads provided with windows and an outlet zone without pressure preceding two dies of 6 mm each centered on the axis of one screw.

For a rotary speed of 80 rpm, a flow rate of 30 kg/h was obtained. The outlet temperature of the material was limited to 115° C. by cooling the sleeve to a temperature of 70° to 80° C. The paste was then subjected to a liquid conching step by kneading with the desired proportion of cocoa butter, but of which the duration had been reduced to five minutes. It was thus possible to obtain a chocolate paste having a viscosity of 11 poises and a flow limit of 100 dynes/cm$^2$. By carrying out the dry-conching in two extrusion steps under the same conditions and followed by liquid conching for 5 minutes, the viscosity of the paste obtained was 9 poises and the flow limit 60 dynes/cm$^2$. Such characteristics are very comparable with those of a reference paste which has undergone conventional conching treatment and which, starting from the same raw material, can have a viscosity of 10 poises and a flow limit of 50 dynes/cm$^2$.

In certain cases, the effect of rolling and shearing caused by passage through the braking zones with reverse pitch is too strong and determines by self-heating a temperature rise which it is no longer possible to control with accuracy. This is the case in particular for the manufacture of milk chocolate, which is more sensitive than plain chocolate to the effects of temperature and must not exceed a conching temperature of the order of 70° C. In fact, taking into account the presence of powdered milk in the refined paste, an exaggerated rise in temperature can result in a burnt taste and the formation of agglomerates of particle size higher than 30 microns and consequently noticeable in the taste. In this case, the braking zones must be constituted by screw elements causing more moderate effects, and it is advantageous to use for this purpose kneading disks, as. This is what is shown in FIG. 5 which is a side view, in axial section, of a machine used for the manufacture of milk chocolate.

As previously, the screw conveyor comprises two screws 3 and 3' rotated inside an elongated sleeve 2. The refined paste emerging from the crusher 14 and containing powdered milk, powdered sugar and cocoa, is introduced into the feed hopper 20 and drawn by the screws which, in the feed zone A, are provided with wide pitch threads.

Figure 6:
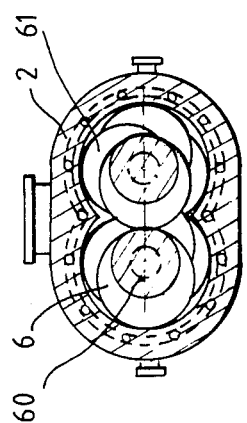
FIG. 6 is a sectional view, along the line VI—VI of FIG. 5.

As previously, the treatment zone B comprises a first progressive compression section B1 provided with close pitch threads and a braking section B2 constituted by eccentric kneading disks. As can be seen in FIG. 6, which is a cross-sectional view, the kneading disks are juxtaposed circular disks 6, 6' whose centers 60 are angularly offset so as to follow a line rotating in a helix around the axis of the screw. The material thus passes through a space rotating in a helix and it is crushed at the same time against the walls of the sleeve. In regulating the number and eccentricity of the kneading disks, it is possible to control the intensity of the forces of rolling and shearing which are produced, and in particular the space 61 for passage of the material can rotate around the axis in reverse direction from the rotational direction of the screws so as to cause an increased braking force and consequently an increase in the passage time.

It is possible also, to reduce the effects of shearing, to eliminate the diaphragm 8 and to make the braking section B2 open directly into the degasifying section C which, as previously, includes wide pitch threads in which the material emerging from the kneading disks can spread out.

Thus it is possible to subject the paste to rolling and shearing effects which are moderate but sufficient to cause the dispersion of the solid particles into the fatty material without substantially heating the material. Besides, it may be necessary, instead of cooling the sleeve, to heat it by circulating a heat transfer fluid at a temperature of the order of 60° to 70° C.

Considering the moderation of the kneading operation, it is generally necessary to carry out dry conching in at least two successive treatment zones, which permits, as has been seen, the degasification to be effected under optimal conditions. As indicated above, the effectiveness of the degasification and the quality of the paste can be observed, in the course of the treatment, through the degasifying orifices 23.

At the outlet of the second braking zone C', the material passes into the last section D of the screw conveyor where cocoa butter is introduced through the orifice 28 to effect the liquefaction treatment. Taking into account the drop in viscosity due to the addition of cocoa butter, it is normally possible, in this section, to pass the paste into a reverse thread section D2 where there are principally produced the rolling and shearing effects necessary for the homogenization of the paste. In this zone, a heat transfer fluid flow through the channels 42 enables the paste to be maintained at a temperature below 70° C.

More intense cooling would permit the bringing of the paste at the outlet 27 of the screw conveyor to a temperature which can fall below 30° C. It is hence possible to produce the tempering of the chocolate paste inside the screw conveyor itself so as to mold the paste directly at the outlet. Thus, while retaining the steps of the conventional process, i.e., dry conching, liquid conching and tempering, the whole of the operations following the refining is carried out continuously in a short time within the same machine of very small size, since it is possible to obtain a flow rate of 20 kg/h with a machine having a length less than 2 meters.

The invention is not limited to the details of the embodiments which have been described. In particular, the composition of the screws depends, as has been seen, on the nature of the refined paste and the treatment which it is desired to carry out.

Moreover, the principal novelty of the process resides in carrying out true dry conching within the screw conveyor and, if appropriate to carry out therein also liquid conching; this operation, which is easier, could however be carried out in other types of equipment.

Similarly, while conventional liquid conching by incorporation of cocoa butter has been described, it would also be possible to obtain the liquefaction of the paste by means of other known additives.

We claim:

1. Process for the continuous preparation of a chocolate paste, comprising the steps of:
   (a) introducing, at an upstream end of a screw conveyor having a plurality of treatment zones (A, B, C, D) and comprising an elongated sleeve surrounding at least two screws (3) driven in rotation and provided with means (41, 42) for regulating the temperature of entrained material, a refined paste comprising cocoa, refined sugar and a small portion of fatty materials
   (b) effecting dry conching of said refined paste in a first section of said screw conveyor, said dry conching comprising the steps of (i) simple kneading of said refined paste in a first step (A), accompanied by a rise in temperature;

(ii) at least one further kneading step (B) producing rolling and shearing effects of progressively increasing intensity, said intensity being coordinated with said temperature regulating means (41, 42); and (iii) a degasifying step (C) following each said further kneading step (B);

(c) introducing downstream of said first section of said screw conveyor remaining portions of ingredients comprising a portion of said fatty materials greater than said previously introduced small portion, and then (d) effecting liquid conching in a second portion of said screw conveyor, said liquid conching comprising a step (D) producing combined kneading, rolling and shearing effects.

2. Process according to claim 1, wherein said ingredients comprise cocoa butter.

3. Process according to claim 1, wherein said ingredients comprise lecithin.

4. Process according to claim 1, wherein dry conching is carried out progressively in a plurality of successive treatment zones each comprising a kneading zone (B) and a degasifying zone (C).

5. Process according to claim 1, wherein, said screws (3) being composed of juxtaposed sections having different configurations producing different effects on a given refined paste of homogeneous quality, the composition, length and number of said treatment zones are determined empirically by successive tests for an average rotary speed of said screws (3), whereby the temperature of the material can be kept at each point at a desired level by the combined effects of self-heating due to friction and regulation of the temperature of said screw conveyor, and production is continued by modifying the rotary speed of said screws and said temperature regulation, and by controlling the release of water and undesirable aromas through said degasifying zones and the taste and particle size of said paste at the outlet from said screw conveyor.

6. Process according to any one of claims 2 to 5, wherein regulation of the temperature of said material is effected by circulation of a heat transfer fluid in portions of said screw conveyor in contact with the paste, at least along said sleeve (2).

7. Process according to any one of claims 2, 4 and 5, wherein degasification is produced by expansion of the paste in said degasifying zone (C) located downstream of each treatment zone (B), and wherein said screws (3) are provided with threads of wide pitch for conveying said material without compression, and said sleeve (2) is provided with at least one orifice (23) for evacuating the gases being discharged from the paste.

8. Process according to claim 7, wherein at the end of each kneading step (B) the paste is formed into filaments (9) which then pass into the succeeding degasifying zone (C).

* * * * *